United States Patent
Nair et al.

(10) Patent No.: US 11,275,203 B2
(45) Date of Patent: Mar. 15, 2022

(54) METHOD OF MAKING OPACIFYING ARTICLES

(71) Applicant: Eastman Kodak Company, Rochester, NY (US)

(72) Inventors: Mridula Nair, Penfield, NY (US); Mary Christine Brick, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 118 days.

(21) Appl. No.: 16/131,351

(22) Filed: Sep. 14, 2018

(65) Prior Publication Data
US 2020/0088915 A1    Mar. 19, 2020

(51) Int. Cl.
| | |
|---|---|
| *G02B 5/00* | (2006.01) |
| *C08L 1/14* | (2006.01) |
| *A47H 23/10* | (2006.01) |
| *E06B 9/24* | (2006.01) |
| *B32B 37/12* | (2006.01) |
| *B32B 37/18* | (2006.01) |

(52) U.S. Cl.
CPC .............. *G02B 5/003* (2013.01); *A47H 23/10* (2013.01); *B32B 37/12* (2013.01); *B32B 37/182* (2013.01); *C08L 1/14* (2013.01); *E06B 9/24* (2013.01); *B32B 2305/026* (2013.01); *B32B 2305/18* (2013.01); *B32B 2307/41* (2013.01); *C08L 2205/025* (2013.01); *C08L 2205/03* (2013.01); *C08L 2205/14* (2013.01); *Y10T 156/10* (2015.01)

(58) Field of Classification Search
CPC ......... B32B 5/022; B32B 5/024; B32B 5/026; B32B 2305/18; B32B 2305/182; B32B 2305/186; B32B 2305/188; B32B 5/245; D06N 2209/0853; D06N 2211/122; D06N 2211/125; G02B 5/003; A47H 23/10; E06B 9/24
See application file for complete search history.

(56) References Cited

U.S. PATENT DOCUMENTS

| | | |
|---|---|---|
| 3,607,341 A | 9/1971 | Goins et al. |
| 3,616,005 A | 10/1971 | Wetstone |
| 4,137,380 A | 1/1979 | Gunning et al. |
| (Continued) | | |

FOREIGN PATENT DOCUMENTS

| | | |
|---|---|---|
| EP | 1380616 | 1/2004 |
| WO | WO 98/42909 | 10/1998 |

*Primary Examiner* — Carson Gross
(74) *Attorney, Agent, or Firm* — J. Lanny Tucker

(57) ABSTRACT

An opacifying article can be made using a (i) fabric having a face side and a back side and an (ii) opacifying element having a substrate that has first and second opposing surfaces; and a dry opacifying layer that has an inner surface and an outer surface. The dry opacifying layer is disposed with its inner surface in contact with the first opposing surface of the substrate. The dry opacifying layer has (a) 40-90 weight % of porous particles, each having a continuous polymeric phase and discrete pores dispersed within the continuous polymeric phase. The porous particles have a mode particle size of 2-50 μm and a porosity of 20-70 volume %. The dry opacifying layer also contains (b) 10-60 weight % of a binder material. The (ii) opacifying element is laminated to the back side of the fabric to provide the opacifying article.

18 Claims, 4 Drawing Sheets

(56) References Cited

U.S. PATENT DOCUMENTS

| | | | |
|---|---|---|---|
| 4,457,980 A | | 7/1984 | Daniels et al. |
| 4,677,016 A | | 6/1987 | Ferziger et al. |
| 5,741,582 A | * | 4/1998 | Leaderman ............... B32B 5/26 |
| | | | 428/317.5 |
| 6,207,250 B1 | | 3/2001 | Bullock et al. |
| 6,541,138 B2 | | 4/2003 | Bullock et al. |
| 6,872,276 B2 | | 3/2005 | Cherpinsky et al. |
| 6,884,491 B2 | | 4/2005 | Rubin et al. |
| 9,469,738 B1 | | 10/2016 | Nair et al. |
| 2002/0122949 A1 | | 9/2002 | Richards |
| 2004/0170800 A1 | | 9/2004 | Richards |
| 2007/0105471 A1 | | 5/2007 | Wang et al. |
| 2015/0093512 A1 | | 4/2015 | Brunner et al. |
| 2015/0234098 A1 | * | 8/2015 | Lofftus ................... C08J 9/0004 |
| | | | 428/220 |
| 2016/0355660 A1 | * | 12/2016 | Brick ................... D06N 3/0065 |
| 2017/0238476 A1 | | 8/2017 | Parrein et al. |

* cited by examiner

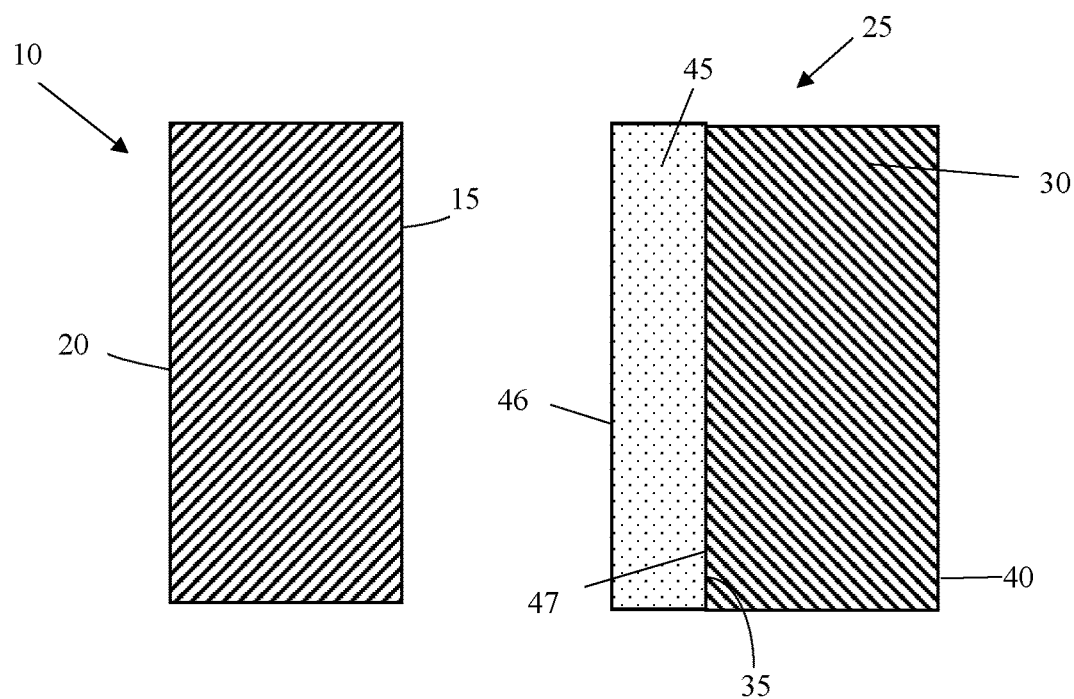
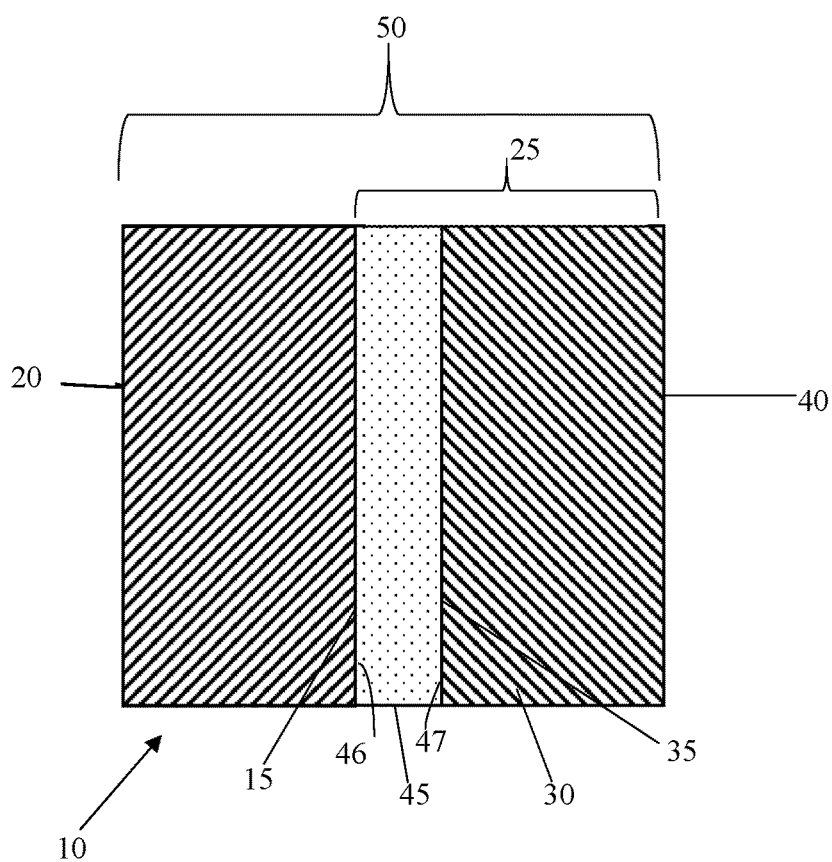
FIG. 1A
FIG. 1B

METHOD OF MAKING OPACIFYING ARTICLES

RELATED APPLICATION

U.S. Publication No. 2020/0088914, by Nair and Brick, entitled "Opacifying Articles", the disclosure of which is incorporated herein by reference.

FIELD OF THE INVENTION

This invention relates to the field of light-blocking materials to provide shades, blinds, or other opacifying articles to block ambient light. In particular, this invention relates to methods for forming opacifying articles that are prepared by laminating an opacifying element containing porous particles to a fabric.

BACKGROUND OF THE INVENTION

In general, when light strikes a surface, some of it may be reflected, some absorbed, some scattered, and the rest transmitted. Reflection can be diffuse such as light reflecting off a rough surface like a white wall, in all directions, or specular, as in light reflecting off a mirror at a definite angle. An opaque substance transmits almost no light, and therefore reflects, scatters, or absorbs all of it. Both mirrors and carbon black are opaque. Opacity depends on the frequency of the light being considered. "Blackout" or light blocking materials typically refer to coated layers in articles that are substantially impermeable to light such as visible and UV radiation. Thus, when a blackout material such as a blackout curtain or blackout shade is hung over a window, it generally blocks substantially all external light from entering the room through that window. Blackout materials are suitable as curtains or shades for use in homes, for institutional use in hospitals and nursing homes, as well as for use in commercial establishments such as hotels, movie theaters, and aircraft windows where the option of excluding light can be desirable.

Light blocking articles such as the blackout curtains can be comprised of a fabric (porous substrate) coated with several layers of a light-blocking composition. There is a need for these curtains, in addition to blocking transmitted light, to have a light color (hue) facing the environment to aid in illumination to minimize the amount of artificial lighting needed to perform the activity. An example is when the function of the blackout material is to separate two areas of activity where one or both areas can be artificially lit at the same time. More often than not, the function of a blackout curtain is to prevent sunlight from entering a room through a building window. It can also be desirable for the color (hue) of the side facing the window to match the exterior décor of the building.

Light colored blackout curtains theoretically can be made by coating porous fabrics with light colored foams containing light scattering pigments such as titanium dioxide or clays. However, very thick foam coatings will be needed to create blackout curtains through which the sun is not visible in a darkened room using only these pigments. One method that is practiced for reducing the weight of such blackout materials is to sandwich a light-absorbing, foamed black or grey pigment, such as a carbon black between two foamed light scattering, white pigment-containing layers.

When an electromagnetic radiation blocking coating has, as it often does, a strongly light absorbing material containing black pigments such as carbon black, between two reflective layers, it has at least two distinct problems. First, such materials require three or more separate coating operations that reduce manufacturing productivity and increase unit costs. Secondly, carbon black in the light absorbing middle layer can become "fugitive" (or non-enclosed) from some puncture or tear occurring during sewing or laundering, and soil other layers such as the reflective layers, which is highly objectionable. Additionally, the stitches generated in the materials during sewing can cause the fugitive carbon black from the light absorbing layer to spread over a larger area thereby increasing the area of objectionable shading of the light-colored surface.

U.S. Pat. No. 7,754,409 (Nair et al.), U.S. Pat. No. 7,887,984 (Nair et al.), U.S. Pat. No. 8,252,414 (Putnam et al.), and U.S. Pat. No. 8,329,783 (Nair et al.) describe porous polymer particles that are made by a multiple emulsion process that provides formation of individual porous particles comprising a continuous polymer phase and multiple discrete internal pores, and such individual porous particles are dispersed in an external aqueous phase. The described Evaporative Limited Coalescence (ELC) process is used to control the particle size and distribution while a hydrocolloid is incorporated to stabilize the inner emulsion of the multiple emulsions that provide the template for generating the discrete pores in the porous particles.

U.S. Pat. No. 9,891,350 (Lofftus et al.) describes improved articles that are designed with an opacifying layer applied to a substrate and that is capable of blocking predetermined electromagnetic radiation.

An improvement in this art is described in U.S. Pat. No. 9,469,738 (Nair et al.) in which small amounts of porous particles containing small amounts of opacifying colorants can be incorporated into foamed compositions that have a foam density of at least 0.1 g/cm$^3$. Such foamed compositions can be applied to a substrate to provide opacification. U.S. Pat. No. 9,963,569 (Nair et al) describes similar technology for making opacifying element using a foamed aqueous latex composition.

U.S. Pat. No. 6,884,491 (Rubin et al.) describes water repellant, water resistant, and stain resistant fabrics that are prepared using treating compositions that are laminated to a backing polymeric film.

U.S. Pat. No. 6,872,276 (Cherpinsky et al.) describes a process for adhesively laminating a metallized coextruded polymeric film to a fabric in the presence of a temporary support layer.

U.S. Patent Application Publication 2004/0170800 (Richards) describes blackout drapery fabrics having a metal-impregnated thermoplastic blackout film that and may be extruded or laminated to a fabric.

There is a need for further improvement to provide a means for easily making a blackout article that can be formed by simple lamination to one side of a fabric without having to metalize the article, and for providing test samples of decorative black-out fabrics without making large production batches.

SUMMARY OF THE INVENTION

The present invention provides a method for providing an opacifying article, comprising:
A) providing (i) a fabric having a face side and a back side;
B) providing (ii) an opacifying element comprising: a substrate that has first and second opposing surfaces; and a dry opacifying layer that has an inner surface and an outer surface, which dry opacifying layer is disposed with its inner surface in contact with the first opposing surface of the substrate, the dry opacifying layer comprising:
(a) at least 40 weight % and up to and including 90 weight % of porous particles, each porous particle comprising a continuous polymeric phase and discrete pores dispersed within the continuous polymeric phase, the porous particles having a mode particle size of at least 2 µm and up to and including 50 µm and a porosity of at least 20 volume % and up to and including 70 volume %;
(b) at least 10 weight % and up to and including 60 weight % of a binder material,
all amounts of (a) porous particles, (b) binder material, being based on the total weight of the dry opacifying layer, and
C) laminating the (ii) opacifying element to the back side of the fabric to provide the opacifying article.

The present invention provides an opacifying element that can, on demand, be laminated to fabrics to provide space "darkening" opacifying articles without the need for a latex foam or metallized layer. Such opacifying elements can be provided in short- or long-run batches, minimizing waste of expensive fabric substrates to which the opacifying element can be easily applied or laminated. The present invention eliminates the need for sewing an extra blackout liner and attaching the same to a fabric substrate. Further, where test samples of blackout materials derived from decorative fabrics are needed by designers to mock up a room, lamination or various opacifying elements on a required yardage of the decorative fabrics becomes more economical than submitting a lot of decorative fabric to a coating conversion that may not suit the décor until after the fact. In a sense, the present invention provides a means for "proofing" a customer's expectations without using directly coated foamed opacifying compositions onto a fabric substrate. The present invention enables a manufacturer or vendor to test product samples at low cost.

BRIEF DESCRIPTION OF THE DRAWINGS

FIG. 1A illustrates partial cross-sectional views of a fabric having face and back sides, and an opacifying element according to the present invention in which the opacifying element has a dry opacifying layer disposed on a first opposing surface of a substrate.

FIG. 1B illustrates a partial cross-sectional view of an opacifying article formed from the fabric and opacifying element of FIG. 1A wherein the dry opacifying layer disposed on the first opposing surface of the substrate is arranged in contact with (laminated) to the back side of the fabric.

DETAILED DESCRIPTION OF THE INVENTION

Figure 2A:
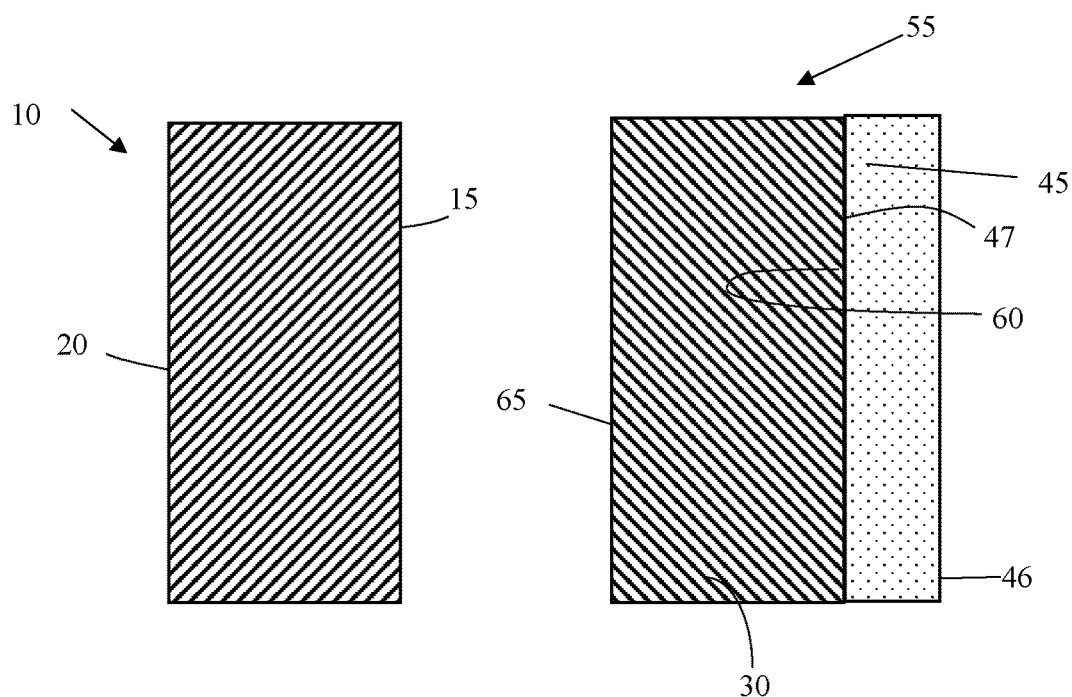
FIG. 2A illustrates partial cross-sectional views of a fabric having face and back sides, and an opacifying element according to the present invention having a dry opacifying layer disposed the second opposing surface of the substrate.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure can have broader use than is explicitly described or discussed for any particular embodiment.

Definitions

As used herein to define various components of the dry opacifying layer, that is the (a) porous particles, (b) binder materials, (c) opacifying colorant, and other materials used in the practice of this invention, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted as having a standard dictionary meaning.

The use of numerical values in the various ranges specified herein, unless otherwise expressly indicated otherwise, are to be considered as approximations as though the minimum and maximum values within the stated ranges were both preceded by the word "about." In this manner, slight variations above and below the stated ranges may be useful to achieve substantially the same results as the values within the ranges. In addition, the disclosure of these ranges is intended as a continuous range including every value between the minimum and maximum values as well as the end points of the ranges.

Unless otherwise indicated, the terms "dry opacifying composition" and "dry opacifying layer" are intended to refer to the same feature.

The terms "porous particle" and "porous particles" are used herein, unless otherwise indicated, to refer to porous polymeric materials useful in the dry opacifying compositions essential for the present invention. The porous particles generally comprise a solid continuous polymeric phase having an external particle surface and discrete pores dispersed within the continuous polymeric phase. The continuous polymeric phase also can be chemically crosslinked or elastomeric in nature.

The continuous polymeric phase of the porous particles generally has the same composition throughout that solid phase. That is, the continuous polymeric phase is generally uniform in composition including any components [for example, (c) opacifying colorant] that can be incorporated therein. In addition, if mixtures of polymers are used in the continuous polymeric phase, generally those mixtures also are uniformly distributed throughout.

As used in this disclosure, the term "isolated from each other" refers to the different (distinct) pores of the same or different sizes that are separated from each other by some portion of the continuous solid phase and such discrete pores are not interconnected. Thus, "discrete" pores refer to "individual" or "closed" non-connected pores or voids distributed within the continuous polymeric phase.

The terms "first discrete pore" and "second discrete pore" refer to distinct sets of isolated discrete pores (individually isolated and closed voids or compartments) in the (a) porous particles. Each distinct set of pores is isolated from other discrete pores in the distinct set of pores, and the discrete pores of each distinct set of pores are isolated from all other discrete pores of the other distinct sets of pores in the (a) porous particle. Each distinct set of discrete pores can have the same mode average size or both sets can have the same mode average size. For making such (a) porous particles, the word "discrete" can also be used to define different droplets of the first and second aqueous phases when they are suspended in the oil (solvent) phase (described in art cited below).

Where there are different sets of discrete pores, the discrete pores of a first set can be predominantly nearer then external porous particle surface compared to the discrete pores of a second set. For example, a set of smaller discrete pores can be predominantly close to the external particle surface compared to a set of larger discrete pores. As used herein, the term "predominant" means that a larger number fraction of discrete pores of one size is found in a "shell" area nearer the surface of the (a) porous particle than one would expect based on the total number fraction of the two or more types (sizes) of discrete pores present in the (a) porous particle.

The (a) porous particles can include "micro," "meso," and "macro" discrete pores, which according to the International Union of Pure and Applied Chemistry, are the classifications recommended for discrete pore sizes of less than 2 nm, from 2 nm to and including 50 nm, and greater than 50 nm, respectively. Thus, while the (a) porous particles can include closed discrete pores of all sizes and shapes (that is, closed, non-interconnected discrete pores entirely within the continuous polymeric phase) providing a suitable volume in each discrete pore, macro discrete pores are particularly useful. While there can be open macro pores on the surface of the (a) porous particle, such open pores are not desirable and may be present only by accident. The size of the (a) porous particles, their formulation, and manufacturing conditions are the primary controlling factors for discrete pore size. However, typically the discrete pores have an average size of at least 100 nm and up to and including 7,000 nm, or more likely at least 200 nm and up to and including 2,000 nm. Whatever the size of the discrete pores, they are generally distributed randomly throughout the continuous polymeric phase. However, if desired, the discrete pores can be grouped predominantly in one part (for example, "core" or "shell") of the (a) porous particles.

The (a) porous particles used in this invention generally have a porosity of at least 20 volume % and up to and including 70 volume %, or likely of at least 35 volume % and up to and including 65 volume %, or more typically of at least 40% and up to an including 60%, all based on the total porous particle volume. Porosity can be measured by a modification of the known mercury intrusion technique.

Unless otherwise indicated, the term "non-porous" refers to particles that are not designed to have discrete pores or compartments within the solid continuous polymeric phase and less than 20% of their total volume consists of pores.

"Opacity" is a measured parameter of an opacifying element according to the present invention, which characterizes the extent to which the transmission of electromagnetic radiation such as visible light is blocked. A greater opacity indicates a more efficient blocking (hiding) of electromagnetic radiation (as described below). In the present invention, the "opacity" of an opacifying element is quantified by measuring the optical density (OD), described below with the Examples, which determines the extent to which the impinging radiation or light is blocked by the opacifying element. The higher the OD, the greater the light blocking ability exhibited by the opacifying element.

Glass transition temperature of the organic polymers used to prepare the continuous polymeric phase, or (b) binder materials described below, can be measured using Differential Scanning calorimetry (DSC) using known procedures. For many commercially available organic materials, the glass transition temperatures are known from suppliers.

Polymer viscosity (in centipoise or mPa-sec) of the polymers comprising the continuous polymeric phase can be measured in ethyl acetate at concentration of 20 weight % of the polymer at 25° C. in an Anton Parr MCR 301 stress rheometer in a Couette cell using steady shear sweeps. Shear rate at 100 $sec^{-1}$ was calculated from the resulting graphical plot of viscosity vs. shear rate.

CIELAB L*, a*, and b* values described herein have the known definitions according to CIE 1976 color space or later known versions of color space and were calculated assuming a standard D65 illuminant and known procedures. These values can be used to express a color as three numerical color values: L* for the lightness (or brightness) of the color, a* for the green-red component of the color, and b* for the blue-yellow component of the color values.

As used herein, the term "fabric" is meant to refer to a material composed of or prepared from naturally occurring fibers, synthetic fibers, or a mixture of naturally occurring fibers and synthetic fibers of any desirable length.

Uses

The method according to this invention can provide a means for easily making an opacifying film (or element) that can be laminated to the back side of a fabric to provide light-blocking decorative fabrics or specific opacity and color. The opacifying articles according to this invention can be useful as blackout materials for various environments and structures. Such opacifying articles may also exhibit improved sound and heat blocking properties. They can be used as, for example, curtains and other window treatments, carpets, window blinds, room dividers, cubicle curtains, banners, labels. projection screens, clothing, coverings and tarpaulins (for example for vehicles, boats, and other objects), and packaging materials. The opacifying articles can optionally have a printable outer surface able to accept ink used in screen printing, gravure printing, inkjet printing, thermal imaging (such as "dye sublimation thermal transfer"), or other imaging processes. Thus, one can provide printable surfaces in such opacifying articles so that the printed image on the back side (non-observer side) is generally not observable from the "face" or observer side.

Opacifying Articles

The present invention can be understood at least in part from the illustrations shown in FIGS. 1A, 1B, 2A, 2B, 3A, 3B, 4A, and 4B.

In FIG. 1A, a partial cross-section view of fabric 10 is illustrated as having back side 15 and face side 20. Opacifying element 25 has substrate 30 having first opposing surface 35 and second opposing surface 40, and dry opacifying layer 45 having outer surface 46 and inner surface 47 that is in contact with (or disposed on) first opposing surface 35.

FIG. 1B shows opacifying article 50 that was formed by bringing together (for example, by lamination) fabric 10 and opacifying element 25 together so that outer surface 46 of dry opacifying layer 45 is arranged in contact (for example, laminated) with back side 15 of fabric 10.

In FIG. 2A, a partial cross-section view of fabric 10 is illustrated as having back side 15 and face side 20. Opacifying element 55 has substrate 30 that has second opposing surface 60 and first opposing surface 65. Dry opacifying layer 45 having inner surface 47 and outer surface 46, is arranged so that inner surface 47 is in contact with second opposing surface 60 of substrate 30.

Figure 2B:
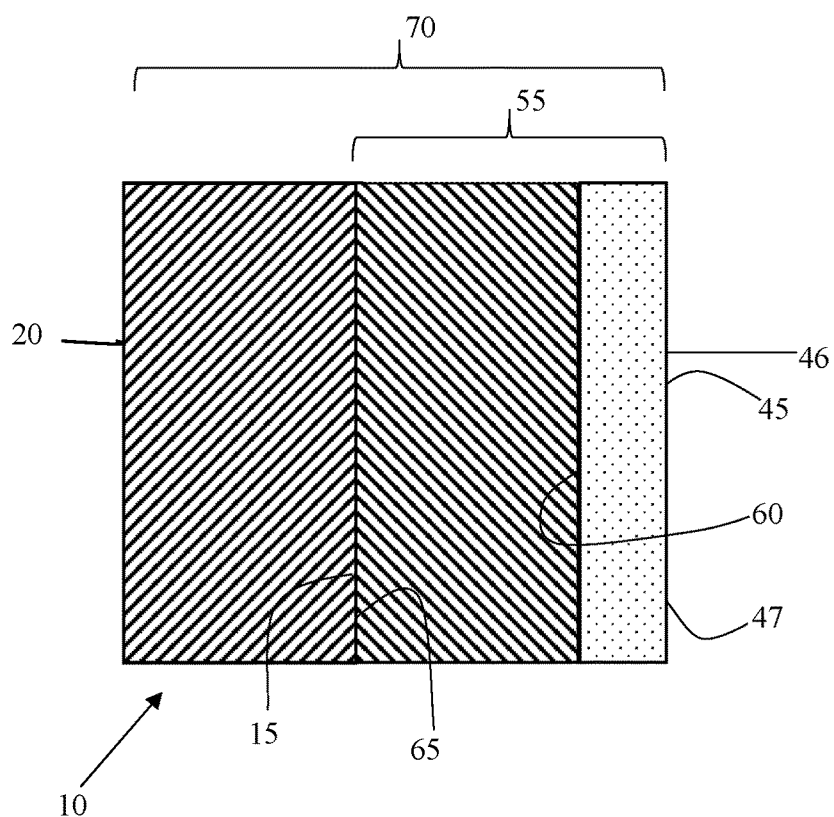
FIG. 2B illustrates a partial cross-sectional view of an opacifying article formed from the fabric and opacifying element of FIG. 2A wherein the dry opacifying layer disposed on the second opposing surface of the substrate, and the opacifying element is arranged so that the first opposing surface of the substrate is in contact with (laminated) the back side of the fabric.

FIG. 2B shows opacifying article 70 formed by bringing fabric 10 and opacifying element laminate 55 together (for example, by lamination) so that first opposing surface 65 is arranged in contact with (laminated to) back side 15 of fabric 10.

Figure 3A:
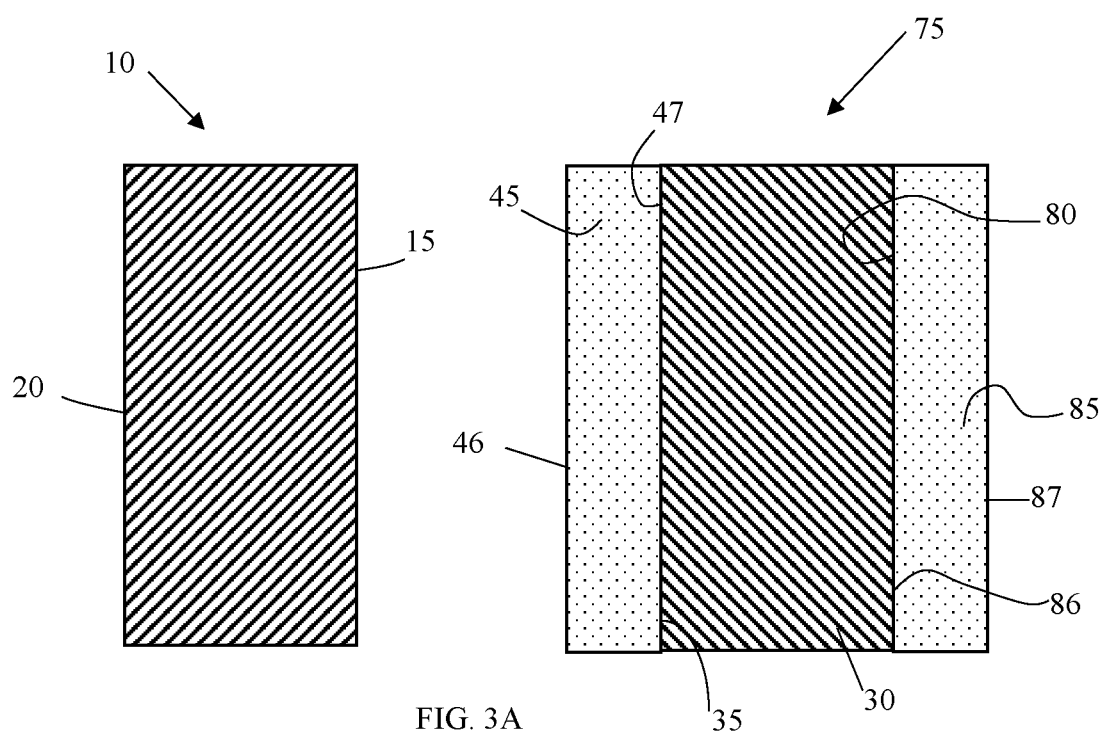
FIG. 3A illustrates partial cross-sectional views of a fabric having face and back sides, and an opacifying element according to the present invention having two dry opacifying layers disposed on its first and second opposing surfaces.

In FIG. 3A, a partial cross-section view of substrate 10 is illustrated as having back side 15 and face side 20. Opacifying element 75 has substrate 30 having first opposing surface 35 and second opposing surface 80. Dry opacifying layer 45 having inner surface 47 and outer surface 46 is arranged in contact with first opposing surface 35. Opacifying element 75 also has second dry opacifying layer 85 having inner surface 86 and outer surface 87, wherein inner surface 86 is arranged in contact with second opposing surface 80. Dry opacifying layer 45 and dry opacifying layer 85 can be the same or different in composition, dry thickness, and opacifying effect.

Figure 3B:
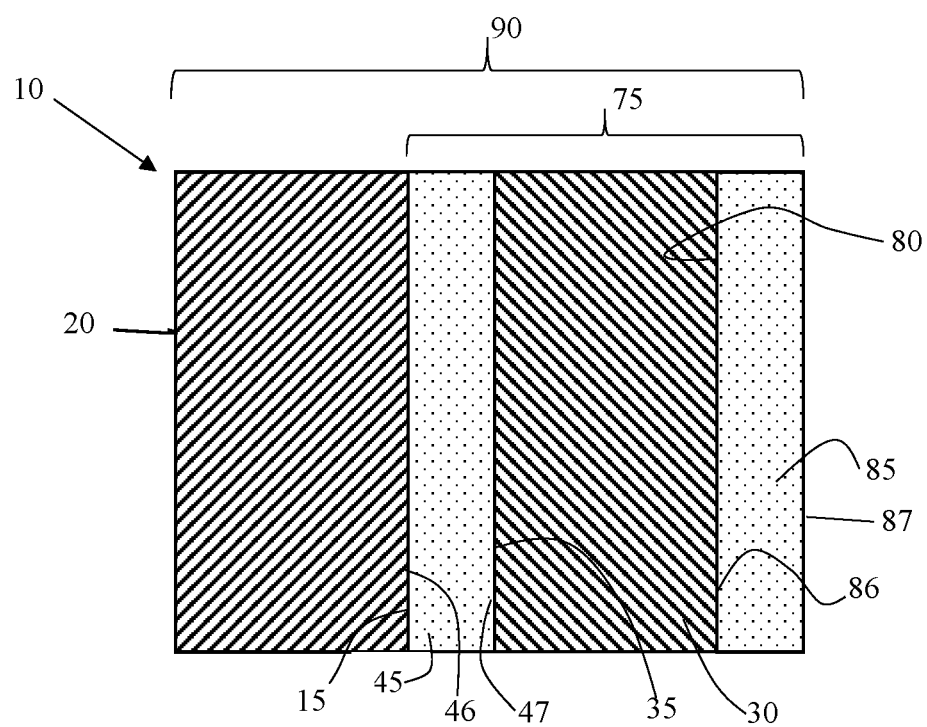
FIG. 3B illustrates a partial cross-sectional view of an opacifying article formed from the fabric and opacifying element of FIG. 3A wherein one of the dry opacifying layers disposed on the substrate is arranged in contact with (laminated) with the back side of the fabric.

FIG. 3B shows opacifying article 90 formed by bringing together (for example, by lamination) fabric 10 and opacifying element 75 so that dry opacifying layer 45 is arranged with its outer surface 46 in contact with back side 15 of fabric 10.

Figure 4A:
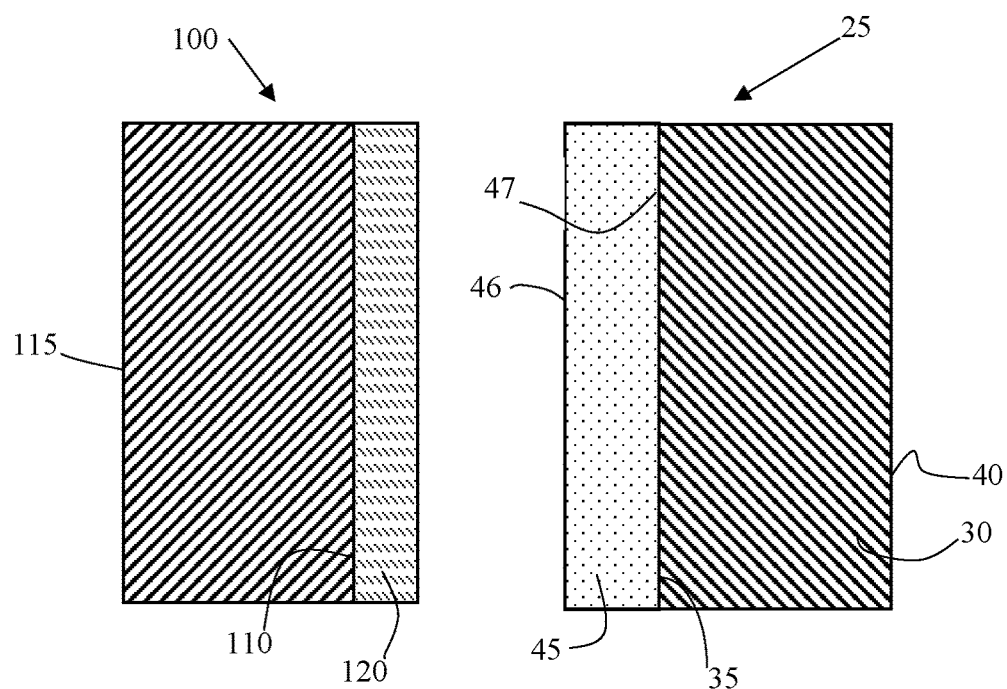
FIGS. 4A and 4B illustrate partial cross-sectional views of embodiments of the present invention like those in FIGS. 1A and 1B except that an adhesive layer is incorporated between the fabric and opacifying element.

In FIG. 4A, a partial cross-section view of fabric 100 is illustrated as having back side 110, front side 115, and adhesive material 120 disposed on back side 110. Opacifying element 25 has substrate 30 having first opposing surface 35 and second opposing surface 40, and dry opacifying layer 45 having outer surface 46 and inner surface 47, which is disposed on first opposing surface 35.

Figure 4B:
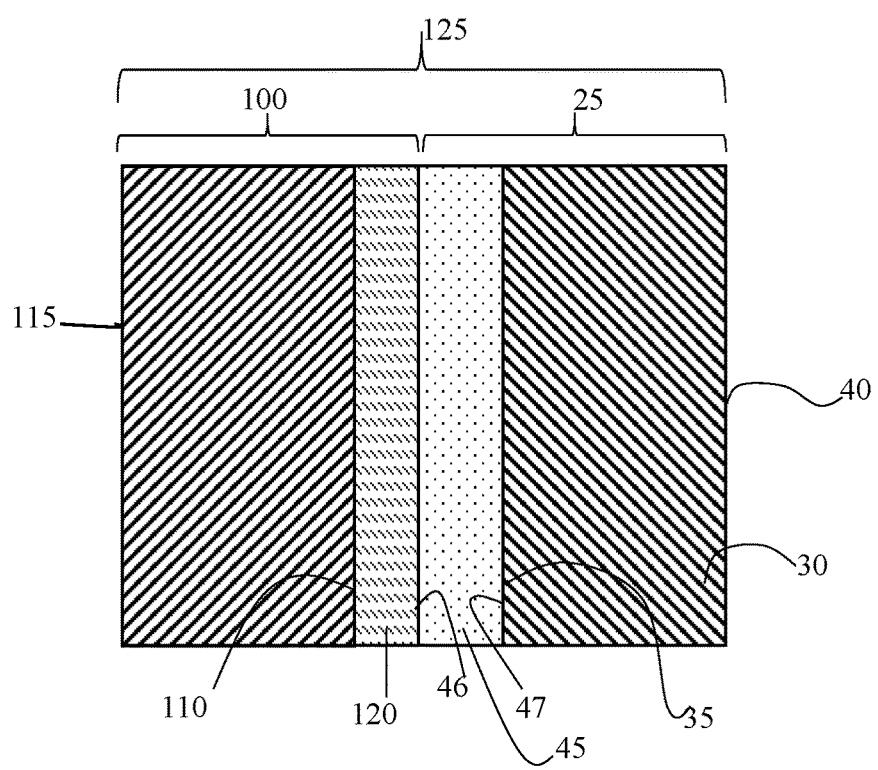

FIG. 4B shows opacifying article 125 formed by bringing fabric 100 and opacifying element 25 together so that outer surface 46 of dry opacifying layer 45 is arranged in contact with adhesive layer 120 that is disposed on back side 110 of fabric 100.

Other structural embodiments not illustrated in these FIGS. are also possible including but not limited to an opacifying article similar to opacifying article 125 but further comprising a second dry opacifying layer disposed on second opposing surface 40 of substrate 30.

Moreover, an adhesive material can be disposed on outer surface 47 of dry opacifying layer 45 rather than on back side 110 of fabric 100, or the adhesive material can be incorporated within dry opacifying layer 45. Thus, a skilled worker could design other useful structural embodiments using this teaching and routine experimentation, all of which would be within the scope of the present invention.

As illustrated in the described FIGS., the opacifying articles according to the present invention are generally planar in nature with smooth or irregular (with small depressions and ridges) outer surfaces.

Fabrics

Each fabric used in the practice of the present invention has a face side (usually the viewable or observer's side) and a back side. These two opposing sides can be the same or different in appearance, texture, feel, or composition, but the back and face side labels are used to distinguish how the opacifying element is arranged in relation to the fabric as illustrated in the FIGS. noted above.

The fabric can be in the form of woven or nonwoven materials that are composed of naturally-occurring fibers, synthetic fibers, or mixtures of naturally-occurring fibers and synthetic fibers. Suitable naturally-occurring fibers include but are not limited to, fibers of cotton, linen, ramie, silk, wool, and others known in the natural world, and blends of fibers of such naturally-occurring materials. Suitable synthetic fibers include but are not limited to, fibers of nylon, polyesters, acrylics, glass (fiberglass), polyurethanes, polyamides, polycarbonates, rayon, polyolefins, celluloses (include woven or non-woven paper materials), acetates, aromatic polyamides, polyvinyl chloride, and others known in the art, as well as combinations or blends of any of these types of fibers, such as polyvinyl chloride coated fibers of various materials. Useful fabrics can be composed of polyvinyl chloride-clad polyester or polyvinyl chloride-clad fiberglass. Suitable fabric materials include but are not limited to, jacquards (that is fabrics manufactured on a jacquard loom), brocades, dobby fabrics, prints, poplins, cross-dyes, crepes, and canvasses.

In some embodiments, the fabric is a porous fabric comprising a plurality of continuous yarn strands, all woven together, wherein each yarn strand comprises a multifilament core that is coated with a coating comprising thermoplastic polymer. Further details for such fabrics and their use are provided in copending and commonly assigned U.S. Ser. No. 15/943,770 (filed Apr. 3, 2018 by Nair, Brick, and Sedita), the disclosure of which is incorporated herein by reference.

In many embodiments, the fabric can comprise a material that has been treated in one or more ways to provide water-repellency or stain resistance, or both. For example, such treatments can comprise applying a suitable fluorochemical treating agent, with or without a suitable antimicrobial agent (or biocide), to the face and back sides of a fabric material as well as to interstitial spaces within the fabric material, to provide a "treated" fabric, followed by suitable drying or curing at elevated temperatures. A representative treatment process is described in Cols. 4-6 of U.S. Pat. No. 6,884,491 (noted above) as well in Cols. 6ff of U.S. Pat. No. 6,541,138 (Bullock et al.), the disclosures of both of which are incorporated herein by reference. The treatment solutions can include one or more biocides (such as antimicrobials), crosslinking agents (including self-crosslinking latex polymers), fire retardants, smoke suppressants, dispersants, thickeners, dyes, pigments, UV light stabilizers, and other additives that would be readily apparent to one skilled in the art.

For example, a fabric material can be treated with at least one or more biocidal agents capable of destroying or preventing the activity of bacteria, viruses, fungi, or mold, many of which materials are known in the art, including antibiotics, trialkyl tin compounds, copper compounds, copper complexes of dehydroabietyl amine or 8-hydroxyquinolinium 2-ethylhexoate, copper naphthenate, copper oleate, organosilicon quaternary ammonium compounds, silver metal and various silver salts.

One or more treatments of the fabric material can be carried out to achieve the desired properties while maintaining desired hand, feel, texture, drape, and aesthetic appearance.

In general, suitable fabrics can have a dry average thickness of at least 50 µm, and the thickness can depend upon the use of the opacifying article and the type of fabric materials available for use. This dry average thickness can be determined when the fabric comprises less than 5 weight % water (based on the total weight of the fabric) using the average of at least 3 measurements taken at different places, or as determined using a suitable micrograph image.

The fabric used in the opacifying article can also have an openness of at least 0% and up to and including 10%, or even at least 1% and up to and including 10%. "Openness" (Openness Factor, or OF) refers to how tight the weave is in a fabric material, the percentage of holes in a fabric construction, and is sometimes referred to as "weave density." The lower the OF, the less the light transmittance and the greater the visible light that is obstructed or blocked. It is the ratio between transparent and opaque surfaces and depends on the spacing and dimension of the yarn.

Opacifying Elements

The opacifying elements used in the present invention comprise a substrate that has first and second opposing surfaces (or two opposing planar sides). As shown in some of the FIGS., a dry opacifying layer can be disposed on either or both the first and second opposing surfaces.

As described above, the opacifying element is arranged in contact with (for example, laminated to) to the back side of the fabric. In some embodiments, this arrangement can mean that the opacifying element is adhered to the back side of a fabric using a suitable adhesive material (see below).

The substrate for the opacifying element generally comprises a material which is suitable for a lamination process. Useful substrates can be composed of various materials including but not limited to, synthetic or non-synthetic (naturally-occurring) polymers or copolymers (generally organic materials), or blends of polymers or copolymers, and can be provided generally in the form of a polymeric film having single or multiple polymeric layers (such as a laminated structure). Representative useful polymeric materials include but are not limited to, nylon or other polyamides, polyesters (such as polyethylene terephthalate), glass, aramides, rayon, acrylics, cellulosic materials [such as triacetyl cellulose, diacetyl cellulose, acetate butyrate cellulose, and acetate propionate cellulose), polyether sulfone, polyacrylic based resins [for example, poly(methyl methacrylate)], polyurethane-based resins, polycarbonates, aromatic polyamide, non-cyclic polyolefins (for example, polyethylene and polypropylene), poly(vinylidene chloride), polycaprolactams, polymers derived from vinyl chloride (for example, poly(vinyl chloride) and vinyl chloride/vinyl acetate copolymers), polyvinyl alcohols, polyvinyl acetates (such as ethylene polyvinyl acetate), silicone resins, polystyrene and polymers derived from styrene derivatives, polysulfone, polyether, cyclic olefin polymers such as polynorbornene, polymethylpentene, polyether ketone, (meth)acrylonitrile], and other organic polymeric film-forming materials that would be apparent to one skilled in the art.

The substrate can be formed of a single film such as a single polymeric film, or it can be a "laminate" or planar composite of multiple polymeric films composed of the same or different chemical composition or physical properties.

Either or both the first and second opposing surfaces of the substrate can be surface treated by various processes including corona discharge, glow discharge, UV or ozone exposure, flame, or solvent washing in order to promote desired physical properties and adhesion of a dry light-blocking composition. An adhesive material can be arranged on either the fabric (back side) or the opacifying element to provide an intermediate adhesive layer and to promote adhesion between the fabric and opacifying elements. Useful adhesive materials are described below.

A substrate can comprise a primer layer comprising one or more polymers designed to promote adhesion of a dry opacifying layer, or to promote adhesive to the fabric.

Ii may be desirable for the substrate to be "transparent" meaning that incident radiation will pass through it with minimal absorption by the substrate material. This transmittance property can be measured by passing light through the substrate and comparing the intensity of the transmitted radiation with the intensity of the incident radiation with a UV-Vis spectrophotometer or Transparency Meter.

As described in several of the FIGS. described above, a dry opacifying layer according to this invention is disposed on one or both of the first and second opposing surfaces of the substrate. For example, as illustrated in FIG. 3A, both first and second opposing surfaces of the substrate can have the same or different dry opacifying layer disposed thereon. In this context, the term "different" is meant to include differences in composition components or amounts, layer coverages, or both.

Each dry opacifying layer useful in the present invention has two essential components (a) and (b) as defined below that are essential for providing desired properties when incorporated as part of an opacifying element or opacifying article. However, a dry opacifying layer can have further advantages by the incorporation therein of an (c) opacifying colorant or one or more additives (e), or both (c) and (e) as defined below, as long as they do not interfere with the properties and purposes of the essential (a) and (b) components. Opacifying compositions used to provide the dry opacifying layers are generally formulated in (d) water and then applied in a suitable manner to the laminate substrate as described below. An advantage of the present invention is that these aqueous opacifying compositions are not "foamed" before their application to a substrate as in prior art processes, for example as described in U.S. Pat. No. 9,469,738 (noted above), thereby simplifying the manufacture and use of the opacifying articles according to this invention.

In reference to a dry opacifying layer, the term "dry" means that the layer comprises water or auxiliary solvents (described below) in an amount of less than 5 weight %, or even less than 1 weight %, based on the total weight of the dry opacifying layer.

Each dry opacifying layer is generally disposed on an opposing surface of the substrate at a dry coverage of at least 50 g/m$^2$ and up to and including 1000 g/m$^2$, or of at least 100 g/m$^2$ and up to and including 500 g/m$^2$.

The opacifying element generally has a dry thickness of at least 100 µm or more likely of at least 300 µm, which dimension is intended to include the substrate, one or more dry opacifying layers, any intermediate adhesive layer, and any other materials adhered thereto. The average dry thickness can be determined by suitably measuring the opacifying element thickness, after drying, in at least three different places and taking an average of the measured values.

(a) Porous Particles:

Porous particles used in the present invention containing discrete pores (or compartments or voids) are generally prepared using one or more water-in-oil emulsions in combination with an aqueous suspension process, such as in the Evaporative Limited Coalescence (ELC) process that is known in the art. The details for the preparation of the porous particles are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), and U.S. Pat. No. 8,252,414 (Putnam et al.), the disclosures of all of which are incorporated herein by reference. Thus, the (a) porous particles are generally polymeric and organic in nature (that is, the continuous polymeric phase is polymeric and organic in nature) and non-porous particles (having less than 20% porosity) are excluded from use in the present invention. Inorganic particles can be present on the outer surface of each porous particle if desired.

The (a) porous particles can be composed of a continuous polymeric phase derived from one or more organic polymers that are chosen so that the continuous polymeric phase has a glass transition temperature ($T_g$) of at least 25° C., or more typically of at least 25° C. and up to and including 180° C., as determined using Differential Scanning calorimetry.

The continuous polymeric phase can comprise one or more organic polymers having the properties noted above, wherein generally at least 70 weight % and up to and including 100 weight % based on the total polymer weight in the continuous polymeric phase. In some embodiments, the continuous polymeric phase is composed of one or more cellulose polymers (or cellulosic polymers) including but not limited to, those cellulosic polymers derived from one or more of cellulose acetate, cellulose butyrate, cellulose acetate butyrate, and cellulose acetate propionate. Mixtures of these cellulose polymers can also be used if desired, and mixtures comprising a polymer derived from cellulose acetate butyrate as at least 80 weight % of the total of cellulose polymers (or of all polymers in the continuous polymeric phase) are particularly useful mixtures. Details about such polymers are provided, for example, in U.S. Pat. No. 9,963,569 (Nair et al.), the disclosure of which is incorporated herein by reference In other embodiments, the continuous polymeric phase can comprise one or more organic polymers such as polyesters, styrenic polymers (for example polystyrene and polychlorostyrene), mono-olefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone). Other useful polymers include polyurethanes, urethane acrylic copolymers, epoxy resins, silicone resins, polyamide resins, and polyesters of aromatic or aliphatic polycarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. The polyesters can be saturated or unsaturated. Other useful polyesters include lactic acid polymers, glycolic acid polymers, caprolactone polymers, and hydroxybutyric acid polymers. Details of such useful polymers are provided, for example in U.S. Pat. No. 9,891,350 (Lofftus et al.) and U.S. Pat. No. 9,469,738 (Nair et al.), the disclosure of which is incorporated herein by reference.

The continuous polymeric binder of the (a) porous particles can also be derived from ethylenically unsaturated polymerizable monomers and polyfunctional reactive compounds as described for example in U.S. Pat. No. 8,703,834 (Nair et al.), the disclosure of which is incorporated herein by reference.

In general, the (a) porous particles used in the present invention have a mode particle size equal to or less than 50 μm, or of at least 2 μm and up to and including 50 μm, or typically of at least 3 μm and up to and including 30 μm or even up to and including 40 μm. Most useful (a) porous particles have a mode particle size of at least 3 μm and up to and including 20 μm. Mode particle size represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical; and coulter counters and other particle characterizing equipment available from Beckman Coulter Diagnostics), software, and procedures.

Pore stabilizing materials such as hydrocolloids can be present within at least part of the volume of the discrete pores distributed throughout the continuous polymeric phase, which pore stabilizing materials are described in the Nair, Nair et al., and Putnam et al. patents cited above. For example, the pore stabilizing hydrocolloids can be selected from the group consisting of carboxymethyl cellulose (CMC), a gelatin or gelatin derivative, a protein or protein derivative, polyvinyl alcohol and its derivatives, a hydrophilic synthetic polymer, and a water-soluble microgel.

It can be desired in some embodiments to provide additional stability of one or more discrete pores in the (a) porous particles during their formation, by having one or more amphiphilic block copolymers disposed at the interface of the one or more discrete pores and the continuous polymeric phase. Such materials are "low HLB", meaning that they have an HLB (hydrophilic-lipophilic balance) value as it is calculated using known science, of 6 or less, or even 5 or less. The details of these amphiphilic polymers and their use in the preparation of the (a) porous particles are provided in U.S. Pat. No. 9,029,431 (Nair et al.), the disclosure of which is incorporated herein by reference. A particularly useful amphiphilic block copolymer useful in such embodiments comprises poly(ethyleneoxide) and poly(caprolactone) that can be represented as PEO-b-PCL. Amphiphilic block copolymers, graft copolymers and random graft copolymers containing similar components are also useful including other polymeric emulsifiers such as GRINDSTED® PGPR 90, polyglycerol polyricinolate emulsifier, obtained from Danisco, Dupont.

Such an amphiphilic copolymer can be generally present in the (a) porous particles in an amount of at least 1 weight %, or at least 2 weight % and up to and including 50 weight %, based on total (a) porous particle dry weight.

The (a) porous particles used in this invention can be spherical or non-spherical depending upon the desired use. In a method used to prepare the (a) porous particles, additives (shape control agents) can be incorporated into the first or second aqueous phases, or in the oil (organic) phase to modify the shape, aspect ratio, or morphology of the (a) porous particles, using known technology. The (a) porous particles can also comprise surface stabilizing agents, such as colloidal silica, on the outer surface in an amount of at least 0.1 weight %, based on the total dry weight of the (a) porous particle.

The average size of the discrete pores in the (a) porous particles is described above.

The (a) porous particles can be provided as powders, or as aqueous suspensions (including water or water with water-miscible organic solvents such as alcohols). Such powders and aqueous suspensions can also include surfactants or suspending agents to keep the (a) porous particles suspended or for rewetting them in an aqueous medium.

The (a) porous particles are generally present in a dry opacifying layer in an amount of at least 40 weight % and up to and including 90 weight %, or typically at least 50 weight % and up to and including 70 weight %, based on the total weight of the dry opacifying layer (including any residual aqueous medium), particularly when the (a) porous particles have a mode size of at least 3 μm and up to and including 20 μm.

In the dry opacifying layer, the large mismatch in refractive index between the discrete pores of the (a) porous particles and the polymer walls (continuous polymeric phase), causes incident electromagnetic radiation passing through the dry opacifying layer to be scattered by the multiplicity of interfaces and discrete pores. The back scattered electromagnetic radiation can again be scattered and returned in the direction of the incident electromagnetic radiation thus reducing the attenuation and contributing to the opacifying power and brightness or luminous reflectance of the dry opacifying layer. If a small amount of (c) opacifying colorant is present in the (a) porous particles, for example either in the discrete pores or in the continuous polymer phase of the (a) porous particles, the opacifying power of the dry opacifying is increased. This is because the multiple scattering of electromagnetic radiation in the dry opacifying layer increases the path length of the electromagnetic radiation through it, thereby increasing the chance that the electromagnetic radiation will encounter the (c) opacifying colorant and be blocked or absorbed by it.

Some particularly useful (a) porous particles comprise a continuous polymeric phase and discrete pores dispersed within the continuous polymeric phase, wherein:

each (a) porous particle has a mode particle size of at least 3 μm and up to and including 20 μm;

each (a) porous particle has a porosity of at least 35 volume % and up to and including 65 volume %;

the continuous polymeric phase comprises one or more polymers, in an amount of at least 70 weight %;

the average size of the discrete pores is at least 50 nm and up to and including 2,000 nm;

the (a) porous particles further comprise a pore stabilizing hydrocolloid within at least part of the volume of the discrete pores, which pore stabilizing hydrocolloid is selected from the group consisting of carboxymethyl cellulose, a gelatin, a protein or protein derivative, polyvinyl alcohol or a derivative thereof, a hydrophilic synthetic polymer, and a water-soluble microgel; and the (a) porous particles comprise one or more amphiphilic low HLB block copolymers disposed at the interface of one or more of the discrete pores and the continuous polymeric phase.

(b) Binder Materials:

The dry opacifying layer also contains one or more (b) binder materials to hold the (a) porous particles, any (c) opacifying colorants, and any (e) additives together on the substrate.

It is particularly useful that a (b) binder material have the following properties: (i) it is water-soluble or water-dispersible; (ii) it is capable of being disposed onto a suitable substrate as described below; (iii) it is capable of being dried and at least partially crosslinked (or at least partially cured); (iv) it has good light and heat stability; and (v) it is film-forming but contributes to the flexibility of the opacifying element and is thus not too brittle, for example generally having a glass transition temperature ($T_g$) of less than 25° C., or a $T_g$ of less than 0° C., or of less than or equal to −10° C., or less than or equal to −25° C., as determined using Differential Scanning calorimetry.

The (b) binder material can include one or more organic polymers that are film forming and that can be provided as an emulsion, dispersion, or in an aqueous solution, and that cumulatively provide the properties noted above. It can also include polymers that are self-crosslinking, or it can include one or more polymers that are self-crosslinking or self-curable, or it can include one or more polymers to which crosslinking agents are added and are thus curable or capable of being at least partially crosslinked under appropriate conditions.

Thus, if the (b) binder material is crosslinkable (or curable) in the presence of a suitable crosslinking agent or catalyst, such crosslinking (or curing) can be activated chemically with heat, radiation, or other known means. A curing or crosslinking process serves to provide improved insolubility of the resulting dry opacifying layer as well as cohesive strength and adhesion to the substrate. The curing or crosslinking agent is generally a chemical having functional groups capable of reacting with reactive sites in a (b) binder material (such as a functionalized latex polymer) under curing conditions to thereby produce a crosslinked structure. Representative crosslinking agents include but are not limited to, multi-functional aziridines, aldehydes, methylol derivatives, and epoxides.

Useful (b) binder materials include but are not limited, to poly(vinyl alcohol), poly(vinyl pyrrolidone), ethylene oxide polymers, polyurethanes, urethane-acrylic copolymers, other acrylic polymers, styrene-acrylic copolymers, vinyl polymers, styrene-butadiene copolymers, acrylonitrile copolymers, and polyesters, silicone polymers or a combination of two or more of these organic polymers. Such (b) binder materials are readily available from various commercial sources or can be prepared using known starting materials and synthetic conditions. The (b) binder material can be anionic, cationic or nonionic in total charge. A useful class of film-forming (b) materials includes aqueous latex polymer dispersions such as acrylic latexes that can be ionic or nonionic colloidal dispersions of acrylate polymers and copolymers. Useful film-forming aqueous latexes include styrene-butadiene latexes, poly(vinyl chloride) and poly(vinylidene chloride) latexes, poly(vinyl pyridine) latexes, poly(acrylonitrile) latexes, and latexes formed from acrylonitrile, butyl acrylate, and ethyl acrylate.

The one or more (b) binder materials can be present in the dry opacifying layer in an amount of at least 10 weight % and up to and including 60 weight %, or typically at least 20 weight % and up to and including 50 weight %, based on the total dry opacifying layer (that is, the total weight of all components including any residual solvent).

It is useful that the dry weight ratio of the (a) porous particles to the (b) binder material in the dry opacifying layer is at least 2:3 and up to and including 9:1, and more likely at least 1:1 and up to and including 3:1.

(c) Opacifying Colorants:

The use of (c) opacifying colorants in a dry opacifying layer is desirable to block or absorb incident electromagnetic radiation within the range of wavelengths of at least 380 nm and up to and including 800 nm. (c) Opacifying colorants can be soluble dyes or pigments, or combinations of each or both types of materials. The amount of electromagnetic radiation that can be blocked or absorbed by an opacifying colorant can be determined by measuring opacity as described below. The opacifying colorants can be a single colorant or a combination of materials that collectively act as the "opacifying colorant."

In many embodiments, one or more (c) opacifying colorants are present within the (a) porous particles, for example, within a volume of at least some, if not all, discrete pores within the (a) porous particles or incorporated within the continuous polymeric binder of the (a) porous particles, or within both the volume of discrete pores and the continuous polymeric binder of the (a) porous particles. This is highly advantageous as the (a) porous particles can be used to "encapsulate" various (c) opacifying colorants as well as tinting colorants and other (e) additives (described below) so they are kept isolated from the other components of the dry opacifying layer. In some embodiments, it can be useful to incorporate (c) opacifying agents solely or additionally within the (b) binder material in which the (a) porous particles are dispersed.

While the (c) opacifying colorants can provide some coloration or desired hue, they are not purposely chosen for this purpose and are thus materials that are chosen to be different from the optional tinting colorants described below.

Examples of (c) opacifying colorants that can be used individually or in combination include but are not limited to, neutral or black pigments or dyes, carbon black, black iron oxide, graphite, aniline black, anthraquinone black, and combinations of colored pigments or dyes such as cyan, magenta, yellow, green, orange, blue, red and, violet dyes. The present invention is not limited to only the specific (c) opacifying colorants described herein but these are considered as suitable guidance for a skilled worker to devise other combinations of (c) opacifying colorants for the desired absorption in a chosen range of electromagnetic radiation. A carbon black or neutral or black pigment or dye other than a carbon black, of which there are many types available from commercial sources, is particularly useful as a (c) opacifying colorant.

The (c) opacifying colorant can be generally present in the dry opacifying layer in an amount of at least 0.001 weight % and up to and including 0.5 weight %, or even at least 0.003 weight % and up to and including 0.3 weight %, all based on the total weight of the dry opacifying layer (including any aqueous medium). As mixtures of the materials can be used if desired, these amounts also refer to the total amount of a mixture of materials used as the (c) opacifying colorant. As noted above, an (c) opacifying colorant can comprise a combination of two or more component materials (such as a combination of dyes or a combination of pigments) designed in hues and amounts so that the combination meets the desired black-out and coloration properties described herein.

In some embodiments, the (c) opacifying colorants, if in pigment form, are generally milled to a fine particle size and then encapsulated within the volume of the discrete pores of the (a) porous particles by incorporating the milled pigment within an aqueous phase used in making the (a) porous particles. Alternatively, the (c) opacifying colorant can be incorporated within the continuous polymeric phase of the (a) porous particles by incorporating the (c) opacifying colorant in the oil phase used in making the (a) porous particles. Such arrangements can be achieved during the manufacture of the (a) porous particles using the teaching provided herein and the teaching provided in references cited above for making the (a) porous particles.

In some embodiments, it can be useful to incorporate at least 95% (by weight) of the total (c) opacifying colorant within the volume of the (a) porous particles (either in the discrete pores, continuous polymeric phase, or both), and to incorporate the remainder, if any, within the (b) binder material. However, in many other embodiments, 100% of the (c) opacifying colorant is incorporated within the (a) porous particles. For example, more than 50% of the total (c) opacifying colorant can be disposed or incorporated within the continuous polymeric phase of the (a) porous particles, and the remainder can be incorporated within the volume of the discrete pores. Alternatively, all the (c) opacifying colorant can be incorporated into the volume of the discrete pores.

(d) Aqueous Medium:

After the aqueous formulation (described below) has been applied to one or both opposing surfaces of the substrate and dried, residual aqueous medium including water or auxiliary solvents (described below) in the dry light-blocking composition is desirably less than 5 weight %, or even less than 2 weight %, of the total dry opacifying layer weight.

(e) Optional Additives:

Optionally, the dry opacifying layer according to this invention can further include at least 0.0001 weight % and up to and including 20 weight % and typically at least 1 weight % and up to and including 15 weight %, based on the total weight of the dry opacifying layer (including any residual aqueous medium), of a combination of (e) additives that are not (a) porous particles, (c) opacifying colorants, or (b) binder materials. Such (e) additives include materials such as dispersants, plasticizers, inorganic or organic pigments and dyes (for example, pigment or dye colorants different from the (c) opacifying colorants described above), flame retardants, biocides (such as fungicides and antimicrobials), preservatives, thickeners, pH buffers, optical brighteners, tinting colorants, flocking agents, thickeners, and inert inorganic and organic fillers that are not inorganic or organic pigments (colorants). The noted amounts refer to the total of all (e) additives. There can be mixtures of each type of (e) additive or mixtures of two or more types of (e) additives in each dry opacifying layer.

Such (e) additives are different from the (c) opacifying colorants because individually or collectively, they will not substantially block or absorb incident electromagnetic radiation in the wavelength range of at least 380 nm and up to and including 800 nm, as determined in the manner described above for the (c) opacifying colorant.

Any of these (e) additives thereof can be present within any location of the dry opacifying layer, including but not limited to: the continuous polymeric phase of the (a) porous particles; a volume of some or all the discrete pores of the (a) porous particles; or both the volume of the discrete pores and the continuous polymeric phase of the (a) porous particles. Alternatively, one or more of such (e) additives can be present in the (b) binder material alone, or in both the (b) binder material and in the (a) porous particles.

It would also be understood that while such (e) additives can be in the dry opacifying layer, and the same or different (e) additives can be present in the fabric described above.

Thus, any (e) additive can be present in the same or different amounts in multiple locations in the opacifying article according to the present invention.

The "inert" inorganic or organic fillers are particles that can be added to reduce the use of more expensive (b) binder materials. Such inert materials do not undergo a chemical reaction in the presence of water or other components in an aqueous formulation (described below); nor do they absorb electromagnetic radiation like the (c) opacifying colorants. Useful inert organic or inorganic filler materials include but are not limited to titanium dioxide, talc, clay (for example, kaolin), magnesium hydroxides, aluminum hydroxides, dolomite, glass beads, silica, mica, glass fibers, nano-fillers, calcium carbonate, and combinations thereof.

An (e) additive can be a surfactant that is defined as a compound that reduces surface tension in an aqueous formulation composition.

Useful biocides (that is, antimicrobial agents or antifungal agents) that can be present as (e) additives include but are not limited to, silver particles, platelets, or fibrous strands, and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper particles, platelets, or fibrous strands and copper-containing compounds such as copper chelates and copper salts can be present as (e) additives for biocidal purposes.

It can also be useful to include thickeners as (e) additives to modify the viscosity of the aqueous formulation and to control its rheology.

Useful (e) additives can comprise one or more tinting colorants that can be used to provide a specific observable color, coloration, or hue in the resulting dry opacifying layer. These materials are not chosen to provide the opacifying property described below for the (c) opacifying colorants and thus, tinting colorants are intended to be different materials having a different purpose.

Mixtures of different tinting colorants can be present. The desired coloration or hue can be obtained using specific tinting colorants can be used in combination with (c) opacifying colorant(s) described below to offset or modify the original color of an opacifying element without such materials to provide more whiteness (or brightness) in the final "color" (or coloration). The one or more tinting colorants can be incorporated within the (a) porous particles (either within the volume of discrete pores, within the continuous polymeric phase, or in both places) or they can be uniformly dispersed within the (b) binder material. In some embodiments, a tinting colorant can be incorporated within the same (a) porous particles that also include an (c) opacifying colorant. Alternatively, one or more tinting colorants can be present within both the (a) porous particles (in a suitable location) and within the (b) binder material.

In some embodiments, a first population (set) of (a) porous particles described herein comprising (c) opacifying colorants, and another population (set) of (a) porous particles described herein comprising tinting colorants can be mixed with the first population of (a) porous particles. The two sets of porous particles can comprise the same or different polymers in the continuous polymeric phase.

The one or more tinting colorants can be present in the dry opacifying layer in an amount of at least 0.0001 weight % and up to and including 3 weight %, based on the total weight of the dry opacifying layer (including residual aqueous medium). Tinting colorants can be dyes or organic pigments that are soluble or dispersible in organic solvents and polymers that are used for making the (a) porous particles and thus can be included within the oil phase used to prepare such (a) porous particles. Alternatively, the tinting colorants can be primarily water-soluble or water-dispersible materials that are included into an aqueous phase used to prepare the (a) porous particles.

It can also be useful to include one or more optical brighteners as (e) additives to increase the whiteness (brightness or "fluorescent" effect) of the final coloration of the backside of the opacifying article. Optical brighteners are sometimes known in the art as "fluorescent whiteners" or "fluorescent brighteners." In general, such materials are organic compounds selected from classes of known compounds such as derivatives of stilbene and 4,4'-diaminostilbene (such as bistriazinyl derivative); derivatives of benzene and biphenyl (such as styril derivatives); pyrazolines; derivatives of bis(benzoxazole-2-yl); coumarins; carbostyrils; naphthalimides; s-triazines; and pyridotriazoles. Specific examples of optical brighteners can be found in various publications including "Fluorescent Whitening Agents," Kirk-Othmer *Encyclopedia of Chemical Technology, Fourth Edition*, volume 11, Wiley & Sons, 1994. One of more of such compounds can be present in an amount of at least 0.001 weight % and up to and including 0.5 weight %, based on the total weight of the dry opacifying layer.

When present, one or more optical brighteners can be present in one or more materials in the dry opacifying layer. For example, an optical brightener can be present in the (b) binder material. Alternatively, an optical brightener can be present within: the continuous polymeric phase of the (a) porous particles; a volume of the first set (or any other set) of discrete pores in the (a) porous particles; or both in a volume of the first set (or any other set) of discrete pores and the continuous polymeric phase, of the (a) porous particles.

Aqueous Formulations

The dry opacifying layers used in the present invention can be provided from corresponding aqueous formulations that can be prepared using the procedures described below.

The essential (a) and (b) components and optional (c) opacifying colorants and (e) additives described above are generally present in an (d) aqueous medium in amounts different from the amounts defined above for the dry opacifying layer. However, the relative percentages (proportions) of the components generally should be the same as the amounts present in the dry opacifying layer.

For example, the (a) porous particles (as described above) can be present in an aqueous formulation in an amount of at least 5 weight % and up to and including 50 weight %, or typically of at least 20 weight % and up to and including 40 weight %, based on the total weight of the aqueous formulation.

One or more (b) binder materials can be present in the aqueous formulation in an amount of at least 10 weight % and up to and including 50 weight % or typically of at least 15 weight % and up to and including 30 weight %, based on the total weight of the aqueous formulation.

The one or more (c) opacifying colorants (as described above) can be present in the aqueous formulation in an amount of at least 0.001 weight % or at least 0.001 weight % and up to and including 0.5 weight %, or even in an amount of at least 0.003 weight % and up to and including 0.2 weight % especially when the opacifying colorant is a carbon black, based on the total weight of the aqueous formulation.

One or more (e) additives (as described above) can be present in the aqueous formulation in an amount of at least 0.0001 weight % and up to and including 30 weight % or typically of at least 0.001 weight % and up to and including 20 weight %, based on the total weight of the aqueous formulation.

Water is the predominant solvent used in an (d) aqueous medium in the aqueous formulations. By "predominant" is meant that of the total weight of solvents in the (d) aqueous medium, water comprises at least 75 weight %, and more likely at least 80 weight % and up to and including 100 weight %, of the total solvent weight. Auxiliary solvents that can be present must not adversely affect or harm the other components in the aqueous formulation. Such auxiliary solvents can be water-miscible organic solvents such as alcohols and ketones.

The aqueous medium can comprise at least 30 weight % and up to and including 70 weight %, or typically at least 40 weight % and up to and including 60 weight %, of the total aqueous formulation weight.

All (a), (b), (c), and (e) components can be suitably mixed in an aqueous medium by dispersing with a cowles blade. Representative time and temperature conditions for making such aqueous formulations would be readily apparent to one skilled in the art.

Making Opacifying Elements

Opacifying elements can be prepared according to the present invention by applying an aqueous formulation described above in a suitable manner and with a suitable application means onto one or both first and second opposing surfaces of a substrate (described above). If an aqueous formulation is applied to only one opposing surface, that opposing surface is defined as the "first opposing surface", and the other opposing surface is defined as the "second opposing surface". As illustrated in FIGS. 1A and 1B, the dry opacifying layer on the first opposing surface can be arranged in contact with the back side of the fabric. Alternatively, as illustrated in FIGS. 2A and 2B, a dry opacifying layer on the second opposing surface of the substrate can be arranged in contact with the back side of the fabric. As noted above, the aqueous formulation is not purposely foamed prior to its application to the substrate.

In some embodiments, the same or different aqueous formulations can be applied to both first and second opposing surfaces of the substrate.

An aqueous formulation can be disposed onto an opposing surface in any suitable manner. For example, an opposing surface of the substrate can be coated with an aqueous formulation using suitable known coating equipment (floating knife, hopper, blade, or gap coating apparatus) and coating procedures including but not limited to blade coating, gap coating such as "knife-over-roll" and "knife-over-table" operation, floating knife, slot die coating, or slide hopper coating, especially if multiple layers are applied to the substrate in the same operation. Thus, the aqueous formulation can be disposed directly onto an opposing surface of the substrate wherein "directly" means there are no intervening or intermediate layers, or it can be disposed indirectly onto the substrate, meaning that an interlayer of some type (primer or adhesive layer) is present.

Once the aqueous formulation has been disposed on an opposing surface of the substrate, it can be dried to remove most or all the (d) aqueous medium that is present. Drying can be accomplished by any suitable means such as by heating with warm or hot air, microwaves, or IR irradiation at a temperature and time sufficient for drying (for example, at least 160° C.) to provide a dry opacifying layer.

Since the aqueous formulation is not intentionally "foamed" prior to its application to the substrate, densification or crushing the applied and dry opacifying layer is not necessary.

Optional curing of the (b) binder materials can be accomplished after drying by heat or radiation or other conditions to which the (b) binder materials and any catalysts are responsive for crosslinking. In some embodiments, a suitable functionalized self-crosslinking latex composition is used as the (b) binder material. During this operation, a curing or crosslinking reaction can occur between reactive side groups of suitable curable polymer chains. If the chosen (b) binder material is not itself heat reactive, suitable catalysts and curing (crosslinking) agents can be added to the aqueous formulation to promote curing or crosslinking.

In addition, each dry opacifying element can be designed to exhibit an L* ("brightness") as determined using procedures described below, of at least 60, or more likely at least 70, or even at least 90.

It is further possible to print images on an outer surface of the opacifying element after drying or curing, using any suitable printing means such as inkjet printing or flexographic printing, thereby forming printed images of text, pictures, symbols, or combinations thereof. Such printed images can be visible, or they can invisible to the unaided eye (for example, using fluorescent dyes in the printed images). Alternatively, an outer surface can be covered by suitable means with a colorless layer to provide a desired protective finish. In many instances, the image formed in this manner, for example, on one outer surface, is not visible or discernible from the other outer surface of the opacifying element.

A thermally printed image can be formed on an outer surface, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches with or without a thermal colorless (clear) patch. Useful details of such a process are provided in copending and commonly assigned U.S. Ser. No. 15/590,342 (filed May 9, 2017 by Nair and Herrick), the disclosure of which is incorporated herein by reference.

Preparation of Opacifying Articles

A suitable fabric as described above can be procured or provided for making the opacifying articles according to the present invention. Additionally, a suitable opacifying element is prepared or procured as described above. The opacifying element and fabric can be brought together into contact in any suitable manner, such as by lamination, so that the dry opacifying layer is arranged in contact with the back side of the fabric. These features are illustrated in FIGS. 1A and 1B.

Alternatively, as illustrated in FIGS. 2A and 2B, the second opposing surface of the opacifying element can be arranged in contact with the back side of the fabric.

In still other embodiments, as shown in FIGS. 3A and 3B, both opposing surfaces of the opacifying element have a dry opacifying layer disposed thereon, and either dry opacifying layer can be arranged in contact with the back side of the fabric.

One suitable technique in which the opacifying element can be arranged in contact with the back side of the fabric is by using an adhesive material such as a thin intermediate heat seal or cold seal adhesive material, for example as illustrated in FIGS. 4A and 4B. In some embodiments, the adhesive material is incorporated within a dry opacifying layer along with the (a) porous particles, (b) binder material, and optional (c) opacifying colorant and (e) additives. The outer surface of this dry opacifying layer can be laminated to the back side of the fabric.

When using a heat seal adhesive, the opacifying element can be supplied from a suitable source (for example, a supply roll); the heat seal adhesive can be applied to the surface to be adhered; and then the opacifying element and fabric from a suitable source (for example, a second supply roll) can be brought together. Alternatively, or additionally, the heat seal adhesive can be supplied to the back side of the fabric and the two materials are brought together. In other embodiments, a heat seal adhesive can be applied to both materials before they are brought together. Or, the heat seal adhesive can be supplied (sprayed or squirted) between the two materials as they are brought together. The heat seal adhesive, after being heated, is then allowed to cool for example to room temperature, followed by laminating the opacifying element article and the fabric.

Suitable adhesive materials are known in the art, and can comprise at least one polyamide, polyester, epoxy resin, acrylic resin, anhydride modified polyolefin, polyurethane, or blends of two or more types of polymers.

Other adhesive materials can be used in the present invention including but not limited to use of a layer of any cold seal or pressure-sensitive, photosensitive, or thermally-sensitive adhesive precursor material, followed by "activation" to create an adhesive layer using pressure, photoexposure, or thermal exposure, respectively. For example, liquid adhesives can be used including plastisol, epoxy, acrylic, organosol, and urethane adhesives that can be applied to either the opacifying element or fabric with a suitable coating technique (gravure cylinder, knife, roller, reverse roller, or anilox roller) under heat, followed by cooling to secure the adhesive bond.

It is also possible to laminate the opacifying element and the fabric without the use of an intermediate adhesive layer. This can be done in any suitable manner known in the art using mechanical means without an adhesive means, using for example, direct calendar lamination to form a mechanical bond between the two elements. In direct calendar lamination, the two materials are brought together for example, under heat from appropriate sources (for example, individual supply rolls) and fed together into pressure rollers or a combination of calendar and embossing rollers to form the mechanical bonding upon cooling. The resulting opacifying article can then be taken up into a roll or otherwise stored or immediately used in finishing operations.

Either or both outer surfaces of the opacifying element can be flocked to provide an attractive surface finish. In general, it can be the opposing surface that is not in contact with the back side of the fabric, that is surface finished in this manner. The dry opacifying layer can also be flocked. Flock refers to very short (0.1 mm and up to several mm) fibers that can be provided using known electrostatic or mechanical techniques. Such a surface then becomes a "flocked surface."

Alternatively or additionally, an opposing surface of the opacifying element that does not have a dry opacifying layer disposed thereon can be modified with embossing or printing to provide a suitable image or pattern using known procedures.

It may also be desirable to incorporate a dried functional composition onto either a dry opacifying layer or opposing surface not having a dry opacifying layer. This functional composition can have any of: (i) inorganic or organic spacer particles having a mode particle size of 1 to 100 µm; (ii) a solid lubricant; and (iii) a tinting material. Details about such functional compositions and how they can be used are provided in U.S. Ser. No. 16/018,367 (filed Jun. 26, 2018 by Nair, Lobo, and Donovan), the disclosure of which is incorporated herein by reference.

The opacifying article provided by the present invention can have an optical density (determined as described below) of at least 3, or even at least 4 or at least 5.

In addition, the opacifying article can further comprise an antimicrobial agent, a flame retardant, or both types of materials, examples of which are described above for the dry opacifying layer.

In addition, the opacifying article can further comprise a surface finish selected from the group consisting of flock, lubricants, anti-blocking agents, antistatic agents, tactile modifiers, visual modifiers, and soil resistance agents. Examples of such materials and the amounts to be used are known in the textile art.

The present invention provides at least the following embodiments and combinations thereof, but other combinations of features are considered to be within the present invention as a skilled artisan would appreciate from the teaching of this disclosure:

1. A method for providing an opacifying article, comprising:
    A) providing (i) a fabric having a face side and a back side;
    B) providing (ii) an opacifying element comprising: a substrate that has first and second opposing surfaces; and a dry opacifying layer that has an inner surface and an outer surface, which dry opacifying layer is disposed with its inner surface in contact with the first opposing surface of the substrate,
    the dry opacifying layer comprising:
        (a) at least 40 weight % and up to and including 90 weight % of porous particles, each porous particle comprising a continuous polymeric phase and discrete pores dispersed within the continuous polymeric phase, the porous particles having a mode particle size of at least 2 µm and up to and including 50 µm and a porosity of at least 20 volume % and up to and including 70 volume %;
        (b) at least 10 weight % and up to and including 60 weight % of a binder material,
        all amounts of (a) porous particles, (b) binder material, being based on the total weight of the dry opacifying layer, and
    C) laminating the (ii) opacifying element to the back side of the fabric to provide the opacifying article.

2. The method of embodiment 1, comprising C) laminating the outer surface of the dry opacifying layer of the opacifying element to the back side of the fabric.

3. The method of embodiment 2, comprising C) laminating the second opposing surface of the substrate to the back side of the fabric.

4. The method of any of embodiments 1 to 3, wherein the opacifying element comprises a second dry opacifying layer disposed on the second opposing surface of the substrate.

5. The method of any of embodiments 1 to 4, comprising C) laminating the opacifying element to the back side of the fabric using an adhesive material.

6. The method of embodiment 5, wherein the adhesive material is a heat seal adhesive or a cold seal adhesive.

7. The method of embodiment 5, wherein the adhesive material is contained within the dry opacifying layer, the outer surface of which is laminated to the back side of the fabric.

8. The method of any of embodiments 1 to 7, comprising C) laminating the opacifying element to the back side of the fabric using mechanical means and without an adhesive material.

9. The method of any of embodiments 1 to 8, wherein the fabric comprises a material that has been treated prior to the C) laminating to provide water-repellency and stain resistance.

10. The method of any of embodiments 1 to 9, wherein C) laminating is carried out by direct calendar lamination.

11. The method of any of embodiments 1 to 10, wherein the fabric comprises an antimicrobial agent, fire retardant, or both an antimicrobial agent and a fire retardant.

12. The method of any of embodiments 1 to 11, wherein the opacifying element has a dry thickness of at least 100 µm.

13. The method of any of embodiments 1 to 12, wherein the substrate comprises a polymeric material selected from the group consisting of polyesters, cellulosic materials, non-cyclic polyolefins, cyclic olefin polymers, polyamides, ethylene vinyl acetate, poly(vinyl chloride), poly(vinylidene chloride), and blends thereof.

14. The method of any of embodiments 1 to 13, wherein the substrate comprises one or more polymeric films.

15. The method of any of embodiments 1 to 14, wherein the (a) porous particles have a mode particle size of at least 3 µm and up to and including 20 µm.

16. The method of any of embodiments 1 to 15, wherein the dry opacifying layer further comprises at least 0.001 weight % of (c) an opacifying colorant that is capable of absorbing electromagnetic radiation having a wavelength of at least 380 nm and up to and including 800 nm.

17. The method of embodiment 16, wherein the (c) opacifying colorant is present in an amount of at least 0.001 weight % and up to and including 0.3 weight %, based on the total weight of the dry opacifying layer.

18. The method of embodiment 16, wherein the (c) opacifying colorant is a carbon black, a neutral black pigment or dye other than a carbon black, or a combination of two or more such materials.

19. The method of embodiment 16, wherein the (c) opacifying colorant is present within the (a) porous particles.

20. The method of any of embodiments 1 to 19, wherein the dry opacifying layer further comprises one or more (e) additives selected from the group consisting of dispersants, plasticizers, flame retardants, optical brighteners, thickeners, biocides, tinting colorants, inert inorganic or organic fillers, and a combination of any of these materials.

21. The method of embodiment 20, wherein the dry opacifying layer further comprises (e) one or more additives that include silver particles or a silver salt.

22. The method of any of embodiments 1 to 21, wherein the weight ratio of the (a) porous particles to the (b) binder material in the dry opacifying layer is at least 2:3 and up to and including 9:1.

23. The method of any of embodiments 1 to 22, wherein the dry coverage of the dry opacifying layer is at least 50 g/cm$^2$ and up to and including 1000 g/cm$^2$.

24. The method of any of embodiments 1 to 23, wherein the (a) porous particles have a mode particle size of at least 3 µm and up to and including 20 µm and a porosity of at least 20% and up to and including 65%; and a carbon black as (c) an opacifying colorant is present in discrete pores of the (a) porous particles in an amount of at least 0.003 weight % and up to and including 0.3 weight %, based on the total weight of the dry opacifying layer.

25. The method of any of embodiments 1 to 24, wherein the fabric has an openness of at least 0% and up to and including 10%.

26. The method of any of embodiments 1 to 25, wherein the fabric is a porous fabric comprising a plurality of continuous yarn strands, all woven together, wherein each yarn strand comprises a multifilament core that is coated with a coating comprising thermoplastic polymer.

The following Examples are provided to illustrate the practice of this invention and are not meant to be limiting in any manner.

The following materials were prepared or purchased as noted and used in the following examples:

NEOCRYL® A-6093, an acrylic, elastomeric emulsion, used as the binder polymer was obtained from DSM;

TERGITOL® 15-S-7 surfactant (Dow Chemical Company), a secondary alcohol surfactant having an HLB value of 12.4, was obtained from the Dow Chemical Corp.;

White woven fabric material used as the "fabric" in the opacifying articles was a woven poplin that had a thickness of 0.0076 inches (0.02 cm).

The substrate used for creating the opacifying elements was a poly(ethylene terephthalate) film having a thickness of 0.0005 inches (0.0127 mm).

Preparation of (a) Porous Particles:

The (a) porous particles used for preparing the opacifying element and opacifying article for each Invention Example are described below along with the characteristics of the particles. All (a) porous particles contained 1 weight % of optical brightener in the continuous polymeric phase.

Porous particles PX containing 0.1 weight % of (c) opacifying colorant (carbon black) in the discrete pores and cellulose acetate butyrate in the continuous polymeric phase were prepared as described in U.S. Pat. No. 9,963,569 (Nair et al.). The resulting (c) porous particles had a particle size of 5 µm and a porosity of 43%.

Porous particle PY containing 0.05 weight % of (c) opacifying colorant (carbon black) in the discrete pores and cellulose acetate butyrate in the continuous polymeric phase were prepared as described in U.S. Pat. No. 9,963,569 (noted above). The resulting (a) porous particles had a particle size of 5.7 µm and a porosity of 49.5%.

Measurements:

The mode particle size of the (a) porous particles was measured using a Sysmex FPIA-3000 Flow Particle Image Analyzer available from Malvern Panalytical. The particle size of the dispersed pigments was determined using light scattering.

The porosity of the (a) porous particles was measured using a modified version of the known mercury intrusion porosimetry method.

The light blocking ability of each opacifying article in the Examples, in transmitted light, was evaluated by measuring its optical density (OD) using a custom-built apparatus consisting of a fiber optic Xenon light source, a computer controlled translational stage, and an optical photometer. The fiber optic was positioned 10 mm above the surface of the opacifying element. A photodetector was placed on the other side of each opacifying article directly under the fiber optic to quantify the amount of light that passed through the opacifying article. The optical density (OD) of each opacifying article was calculated by comparing the light that passed through the opacifying article to the light that reached the detector when the opacifying article was not present.

The luminous reflectance (or brightness) of each opacifying element was determined by first measuring the spectral reflectance in the 400-700 nm wavelength range using a Hunter Labs UltraScan XE colorimeter equipped with an integrating sphere and a pulsed Xenon light source and appropriate filters for standard D65 illumination with the opacifying element facing the light source, either the dry opacifying layer of the substrate side of the opacifying element. A light trap and standard white tile were used to fix the percent reflectance range from 0 to 100%. The X, Y, and Z tristimulus values of each opacifying element were also determined and used in conjunction with the CIELab color space to calculate specific values for the lightness ($L^*$), red-green character ($a^*$), and yellow-blue character ($b^*$) of each opacifying element. The Y tristimulus value was used as a measure of the luminous reflectance or brightness of each opacifying element.

Invention Examples 1a and 1b:

An aqueous composition was prepared by combining 19.4 weight % of NEOCRYL® A-6093 binder polymer, 0.9 weight % of TERGITOL® 15-S-7 surfactant, water, and 29.4 weight % of porous particles PX (having 0.1% carbon black in the discrete pores) in a container. The aqueous formulation was mixed with a Cowles blade until all porous particles were well dispersed, then de-gassed to remove large bubbles so there is no foam in this formulation. The resulting mixed aqueous composition was coated using a blade with a 0.024 inch (0.61 mm) gap onto a substrate (described above) and dried at 35° C. to form a dry opacifying layer on the laminate. The dry opacifying layer had a total dry coverage of 201 g/m² (5.9 oz/yd²) and 0.06 weight % of carbon black. The resulting opacifying element laminate was laminated to the back side of a white woven fabric having a thickness of 0.0076 inches (0.02 cm) with the dry opacifying layer in contact with the fabric back side, to form an opacifying article (Invention Example 1a) according to the present invention.

The second opposing surface of a sample of the same opacifying element was also laminated to the back side of the white woven fabric with the dry opacifying layer facing away from the fabric, to form another opacifying article according to the present invention (Invention Example 1b).

Lamination was carried out for both Examples using a double-sided pressure sensitive, optically clear 2 mil (0.05 mm) adhesive film having peelable liners on both sides. The adhesive film was first applied to the opacifying element and then to the fabric back side.

Invention Examples 2a and 2b:

Invention Example 2 was prepared the same manner as Invention Example 1a except porous particles PY contained 0.05% of carbon black in the discrete pores were used. The aqueous composition was coated and dried in the same manner as for Invention Example 1a. The final dry opacifying layer in the opacifying element had a total dry coverage of 201 g/m² and 0.03 weight % of carbon black. The opacifying element was laminated with the dry opacifying layer in contact with the back side of a white woven fabric to form an opacifying article (Invention Example 2a) according to the present invention.

A portion of this opacifying article was also flocked by applying an adhesive to the opposing surface of the opacifying element facing away from the fabric, followed by application of 0.1 mm cotton flock onto the adhesive with a hand-held sieve. The flocked surface had a fabric-like feel compared to a non-flocked sample of the same opacifying article.

Invention Example 3:

Invention Example 3 was prepared in the same manner as Invention Example 1a except a 50/50 weight % mixture of porous particles PX and PY was used. The aqueous composition was coated and dried in the same manner as for Invention Example 1a. The dry opacifying layer contained a total dry coverage of 201 g/m² and 0.04 weight % of carbon black. The resulting opacifying element was laminated to the back side of a white woven fabric with the dry opacifying layer in contact with the fabric back side.

The optical densities of the various opacifying articles and the colorimetric data of the opacifying elements are shown in TABLE I, wherein all the parameters are as described above. The data for the fabric alone is also shown in the following TABLE I.

TABLE I

| | Optical Density (OD) | $L^*$ | $a^*$ | $b^*$ | Y |
|---|---|---|---|---|---|
| Fabric only | 0.54 | 84.0 | 2.6 | −10.7 | 64.1 |
| Invention Example 1a | 7.1 | 77.8 | 2.2 | −5.1 | 52.8 |
| Invention Example 1b | 6.5 | 75.7 | 2.5 | −5.4 | 49.3 |
| Invention Example 2a | 4.1 | 83.5 | 2.2 | −5.9 | 63.1 |
| Invention Example 2b, Flocked | 4.1 | 84.1 | 2.7 | −7.5 | 64.2 |
| Invention Example 3 | 5.4 | 80.7 | 2.1 | −5.3 | 57.9 |

NA = not applicable

The examples and data in TABLE I indicate that opacifying articles can be prepared by laminating an opacifying element containing porous particles to a fabric according to the present invention, and all opacifying articles exhibited good light blocking with optical densities >4 compared to the fabric alone. The $L^*$, $a^*$, and $b^*$ values describe the properties of the surface of the opaque element in each example, such as the exposed surface of the dry opacifying layer, or the substrate side of the opacifying element, or the flocked surface of the opacifying element. In spite of their high opacity, the opacifying elements exhibited $L^*$ values >70. They also exhibited a high degree of whiteness as indicated by the Y tristimulus value of luminous reflectance greater than 45.

The invention has been described in detail with particular reference to certain preferred embodiments thereof, but it will be understood that variations and modifications can be achieved within the spirit and scope of the invention.

PARTS LIST 10 fabric
15 back side
20 face side
25 opacifying element
30 substrate
35 first opposing surface
40 second opposing surface
45 dry opacifying layer
46 outer surface
47 inner surface 50 opacifying article
55 opacifying element
60 second opposing surface
65 first opposing surface
70 opacifying article
75 opacifying element
80 second opposing surface
85 second dry opacifying layer
86 inner surface
87 outer surface
90 opacifying article
100 fabric
110 back side
115 face side
120 adhesive material
125 opacifying article

The invention claimed is:

1. A method for making an opacifying article without a latex foam or metallized layer, the method comprising:

applying a non-foamed aqueous composition to one or both first and second opposing surfaces of a substrate that consists essentially of a material, or blend of the materials, suitable for a lamination process, the material selected from the group consisting of a polyamide, a polyester, glass, a cellulosic material, poly(methyl methacrylate), a polycarbonate, a non-cyclic polyolefin, a cyclic polyolefin, poly(vinylidene chloride), a polycaprolactam, poly(vinyl chloride), a polyvinyl acetate, and a polystyrene;

drying the applied non-foamed aqueous composition to form a dry non-foamed opacifying layer on the one or both first and second opposing surfaces of the substrate, thereby forming an (ii) opacifying element;

optionally, curing the dry non-foamed opacifying layer on one or both first and second surfaces of the substrate;

providing a (i) fabric having a face side and a back side; and laminating the (ii) opacifying element to the back side of the a (i) fabric to form the opacifying article without a foam latex or metallized layer, wherein the opacifying article without a foam latex or metallized layer is formed without densification of the non-foamed aqueous composition after it is applied to the one or both first and second opposing surfaces, and the non-foamed aqueous composition comprises:

(a) at least 5 weight % and up to and including 50 weight % of porous particles, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %; and (b) at least at least 10 weight % and up to and including 50 weight % of a binder material, all amounts of (a) porous particles and (b) binder material, being based on the total weight of the aqueous formulation.

2. A method for preparing an opacifying article, the method comprising:

providing a non-foamed aqueous formulation comprising:

at least 5 weight % and up to and including 50 weight % of porous particles, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %, at least 10 weight % and up to and including 50 weight % of a binder material; and optionally, at least 0.001 weight % and up to and including 0.5 weight % of one or more opacifying colorants, each of which is capable of absorbing electromagnetic radiation having a wavelength of at least 380 nm and up to and including 800 nm, all amounts being based on the total weight of the aqueous formulation;

coating the non-foamed aqueous formulation on a first opposing surface of a polymeric film substrate that is suitable for lamination;

drying and optionally curing the coating of the non-foamed aqueous formulation to provide a dry non-foamed opacifying layer on the polymeric film substrate, and thereby forming a dry opacifying element, which dry non-foamed opacifying layer has an outer surface and comprises:

(a) at least 40 weight % and up to and including 90 weight % of the porous particles;

(b) at least 10 weight % and up to and including 60 weight % of the binder material; and (c) optionally, at least 0.001 weight % of the one or more opacifying colorants, the amounts of (a) porous particles, (b) binder material, and (c) one or more opacifying colorants being based on the total weight of the dry non-foamed opacifying layer; and laminating the dry opacifying element to the back side of a fabric to form the opacifying article.

3. The method of claim 2, comprising laminating the outer surface of the dry non-foamed opacifying layer of the opacifying element to the back side of the fabric.

4. The method of claim 2, wherein the opacifying element comprises a second dry non-foamed opacifying layer disposed on the second opposing surface of the substrate.

5. The method of claim 2, comprising laminating the opacifying element to the back side of the fabric using an adhesive material.

6. The method of claim 5, wherein the adhesive material is a heat seal adhesive or a cold seal adhesive.

7. The method of claim 5, wherein the adhesive material is contained within the dry non-foamed opacifying layer, the outer surface of which is laminated to the back side of the fabric.

8. The method of claim 2, wherein the fabric comprises a material that has been treated prior to the laminating to provide water-repellency and stain resistance.

9. The method of claim 2, wherein the fabric comprises an antimicrobial agent, fire retardant, or both an antimicrobial agent and a fire retardant.

10. The method of claim 2, wherein the opacifying element has a dry thickness of at least 100 μm.

11. The method of claim 2, wherein the polymeric substrate material that is suitable for lamination is selected from the group consisting of polyesters, cellulosic materials, non-cyclic polyolefins, cyclic olefin polymers, polyamides, ethylene vinyl acetate, poly(vinyl chloride), and poly(vinylidene chloride).

12. The method of claim 2, wherein the (a) porous particles have a mode particle size of at least 3 μm and up to and including 20 μm.

13. The method of claim 2, wherein the dry non-foamed opacifying layer further comprises at least 0.001 weight % of (c) an opacifying colorant that is capable of absorbing electromagnetic radiation having a wavelength of at least 380 nm and up to and including 800 nm.

14. The method of claim 13, wherein the (c) opacifying colorant is a carbon black, a neutral black pigment or dye other than a carbon black, or a combination of two or more of such materials.

15. The method of claim 2, wherein the dry non-foamed opacifying layer further comprises one or more (e) additives selected from the group consisting of dispersants, plasticizers, flame retardants, optical brighteners, thickeners, biocides, tinting colorants, inert inorganic or organic fillers, and a combination of any of these materials.

16. The method of claim 2, wherein the weight ratio of the (a) porous particles to the (b) binder material in the dry non-foamed opacifying layer is at least 2:3 and up to and including 9:1.

17. The method of claim 2, comprising laminating the dry opacifying element to the back side of the fabric to form the opacifying article, using mechanical means and without an adhesive material.

18. The method of claim 2, comprising laminating the dry opacifying element to the back side of the fabric to form the opacifying article, using direct calendar laminination.

\* \* \* \* \*